July 16, 1968 S. P. CLURMAN 3,392,927

TAPE TRANSPORTS

Filed Oct. 21, 1966

INVENTOR.

Stanley P. Clurman

BY

Edward J. Norton

Attorney

United States Patent Office
3,392,927
Patented July 16, 1968

3,392,927

TAPE TRANSPORTS

Stanley P. Clurman, Trenton, N.J., assignor to Radio Corporation of America, a corporation of Delaware Filed Oct. 21, 1966, Ser. No. 588,462
6 Claims. (Cl. 242—55.12)

Figure 1:
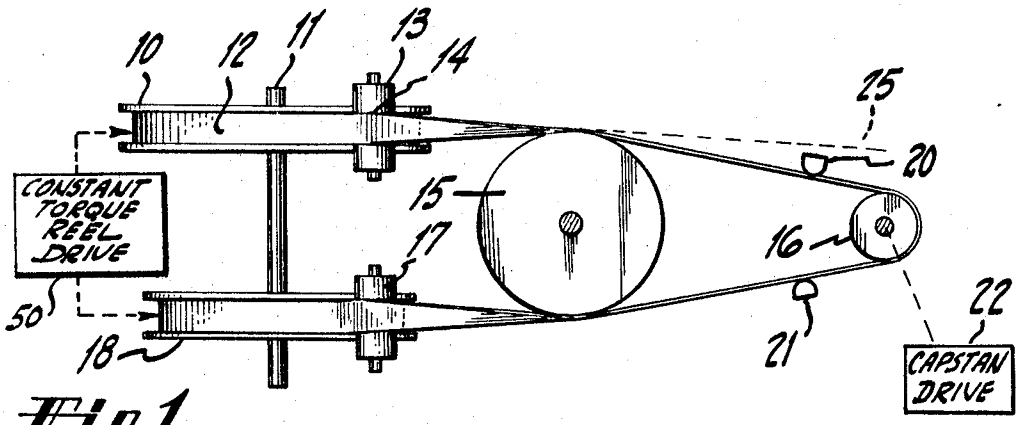

This invention relates to tape transports and more particularly to an improved tape transport suitable for use in satellite signal recorders or in other applications where high performance and compactness of equipment are necessary.

Designers of tape recorders have in the past resorted to elaborate guide mechanisms in applications where precise and accurate control of the tension and path of the tape are required. Edge guides, guide rollers or crown rollers are used to assure that the tape follows a desired path with proper tension and with as constant a velocity as desired or needed for the particular application. With the increased usage of satellites for space missions and for data collecting voyages, there is needed a compact tape transport having a minimum of guide mechanisms and complication, as well as one capable of performing with good tape tracking. The ability of a recorder or transport to exhibit good tape tracking affords one the capability of increased signal packing density and in general will give better signal-to-noise operation. It is also desirable to provide in such recorders a tape transport that exhibits a low amount of flutter while still possessing the above mentioned characteristics.

It is therefore an object of the present invention to provide an improved tape transport with a minimum of guiding mechanisms.

It is another object to provide an improved tape transport providing a low amount of flutter.

Another object is to provide an improved tape transport having a high performance tape tracking ability and therefore a transport capable of operating with increased signal packing density and improved signal-to-noise operation.

Figure 2:
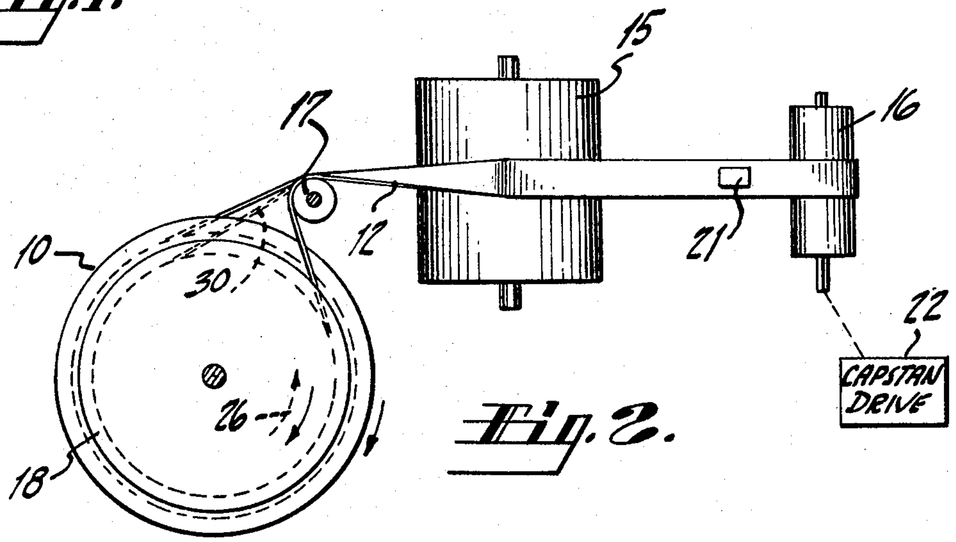
Figure 3:
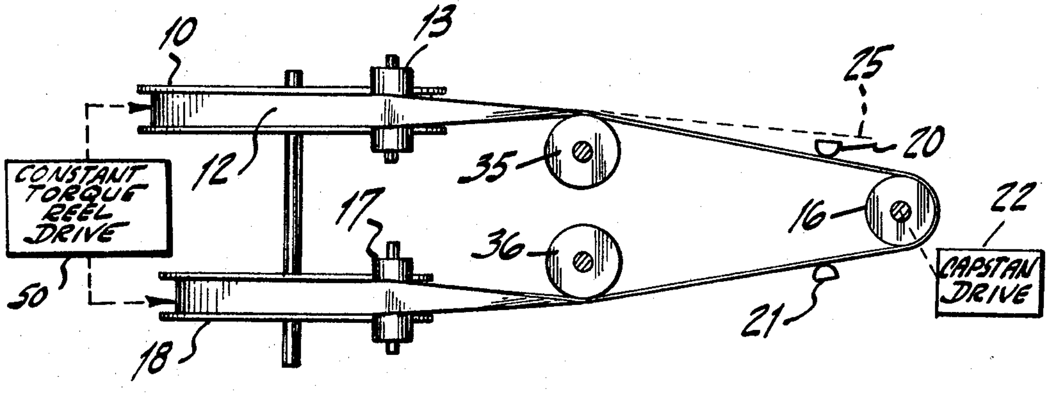

In one embodiment of the present invention a magnetic tape, for example, is stored on two reels which may be coaxial with a different end of the tape secured to each reel, the reels being torqued by constant torque springs, for example. The tape coming off or going on the respective reels coacts with a separate positioning idler. There is one positioning idler for each of the reels, the positioning idlers functioning to positively locate the tape. The tape coming off one of the reels which may be the supply reel first coacts with its respective positioning idler and then undergoes a 90 degree twist. The twisted tape then passes over an idler roller whose central axis is located near a center line perpendicular to the axis of rotation of the reels. The tape after passing over the idler roller is caused to wrap around a capstan whose diameter is significantly smaller than the diameter of the idler roller and whose axis of rotation is parallel to the axis of rotation of the idler roller. The tape passes around the capstan and again contacts the idler roller at a point spaced 180 degrees from the point where the tape contacts the idler roller in passing from the supply reel to the capstan. Thus the tape contacts the idler roller on a diameter drawn through the axis of rotation of the idler roller. The tape is pressed flat against the idler roller as it passes thereover by natural tension effects as a consequence of the tape's path to the smaller diameter capstan. The tape thereafter undergoes a 90 degree twist reversed with respect to the first twist therein and, coacting with the positioning idler associated with the other reel, which may be the take up reel, is then directed onto the other reel. The tension in a tape confined to traverse a path in the above described manner causes the tape center line to form a straight line of minimum length between the contact points on the positioning idlers and the capstan. This provides positive tape guidance without the objectional effects of other guiding systems such as edge guidance, crown guidance and so on. Double contact of the tape with the idler roller serves to reduce flutter. The invention and other objects will become clearer from the following description taken in conjunction with the accompanying drawing in which:

FIGURE 1 is a top view of one embodiment of a tape transport according to this invention, FIGURE 2 is a side view of the tape transport shown in FIGURE 1, FIGURE 3 is a top view of an alternate embodiment according to the principles of this invention.

If reference is made to FIGURE 1, numeral 10 refers to a supply reel mounted on a shaft 11. The shaft 11 may be rotatably mounted in a conventional manner and therefore rotation imparted to the shaft 11 by means of a motor or other suitable device, not shown, will also impart rotation to the reel 10. Of course the reel 10 may also be rotated by some other means. For example, it may operate in conjunction with a constant torque reel drive system. Such a system is depicted as 50 in FIG. 1. Various suitable constant torque systems are now in use and would be used in connection with reel 10 and a second reel 18 to be described in a conventional manner.

The supply reel 10 holds a tape 12 one end of which is secured to the reel 10 in a conventional manner such as by screws, clamps or some other suitable means, not shown. The tape 12 is positively located by causing it to contact a positioning idler 13, which idler is rotatably mounted above the tape reel 10. The tape 12 is now twisted at an angle of 90 degrees starting approximately at point 14 on the positioning idler 13. The twisted tape 12 is caused to contact the surface of a larger diameter idler or idler roller 15. Tape 12 is then caused to wrap around a capstan 16. The wrap of the tape about capstan 16 and the physical placement of the capstan 16 is designed to cause a natural tension on the tape 12 which in turn forces the tape to press flat against the idler roller 15. This is achieved in part by dimensioning the capstan 16 to be substantially smaller in diameter than the idler roller 15. The capstan 16 is rotatably mounted with its axis of rotation parallel to the axis of rotation of the idler roller 15 and the plane defined by these two parallel axes is perpendicular to the axis of rotation of the supply reel 10. The capstan 16 is further separated from the idler roller 15 by a suitable distance determined by the amount of tension desired on the tape and the slope of the tangent formed by the tape and its points of contact on the idler roller 15 and the capstan 16.

As can be seen from FIGURE 1, the capstan 16, the idler roller 15 and the supply reel 10 are positioned with respect to one another so that the tape 10 is caused to contact the idler roller 15 at two points, substantially 180° apart on the idler roller 15 without any other guide mechanisms between the capstan 16 and the idler roller 15. The tape 12 coming off the other side of the capstan 16 is again made to contact the idler roller 15. The tape 12 is thereafter twisted 90 degrees and made to contact a positioning idler 17 which is associated with a second reel 18. As reel 10 was referred to as the supply reel then reel 18 may be designated as the take up reel. The take up reel 18 is shown mounted on the same shaft 11 and hence the direction of rotation of reel 18 is the same as that of supply reel 10. It may be visualized that a separate shaft could be provided for each reel and therefore the direction of motion of the supply reel 10 could be opposite to that of the take up reel 18. Reel 18 as well as reel 10 could be rotated by external means and torqued by the constant torque reel drive system 50. There is also shown in the figure two magnetic heads or signal record and pick up devices 20 and 21. These are conventional read-write heads. Such devices as heads 20 and 21 are well known in the art and are not in themselves part of this invention. There is also shown a motor drive system 22 coupled to the capstan 16 to provide rotation thereof. Such coupling may be by belt, gears, cams and so on.

The transport system depicted in FIGURE 1 operates according to the following principles. The tape 12 on the supply reel 10 is brought over the idler 13 which serves to position the tape. The tape is then twisted 90 degrees and is caused to coact with the surface of the idler roller 15 and is then routed around the capstan 16 whose diameter is sufficiently smaller than that of the idler roller 15 to assure that the tape 12 will be under sufficient tension so as to be pressed flat against the idler roller 15. In this sense it is important that the common tangent between the capstan 16 and the idler roller 15 have a greater slope than the slope of a dashed line 25 drawn as an extension of the twisted tape as is enters onto the idler roller 15 from the supply reel 10. The tape 12 going around the capstan 16 is again pressed flat against the idler roller 15 by providing a similar common tangent between the capstan 16 and the idler roller 15 as the tape passes from the capstan 16 to the take up reel 18. The tape 12 undergoes another 90 degree twist after leaving the idler roller 15 and is positively located with respect to the take up reel 18 by the positioning idler 17. The tension on the tape 12 due to the wrap around of the capstan 16 and the double contact points on the idler roller 15 together with any additional tension which may be supplied by constant torque springs, torque motor or some other scheme available in the art causes the tapes 10 center line to lie in a plane from point 14 tangent to capstan 16. Capstan 16 is driven by means of the capstan drive 22 coupled to it. The action of the drive 22 in conjunction with the tension on the tape 12 caused by restraining the tape to traverse the above described path provides positive tape guidance without the objectional effects of physical edge guidance. As the tape 12 moves from the supply reel 10 to the take-up reel 18 it is always in contact with the idler roller 15 at the two points. By exerting force on the tape in this manner the transport's flutter is reduced; while the tension on the tape and the large angle of capstan wrap serves to improve the tape tracking and thereby afford the advantages of high signal packing density and good signal-to-noise operation.

If reference is made to FIGURE 2, a side view of FIGURE 1 is shown taken in the direction of reel 18 in FIGURE 1. The same components have been assigned like numerals to simplify the explanation. FIGURE 2 gives a clearer understanding of how the supply 10 and take-up reel 18 may be rotated in opposite directions. If reel 10 and reel 18 are rotated in the same direction, the tape 12 will come off reel 10 and will go around reel 18 as shown in FIG. 2. However, if it is desired to rotate reel 18 counter to reel 10, as indicated by the direction of the dashed arrow 26 drawn on reel 18, then the tape 12 will pass over the idler 17 and on the reel 18 as shown by the dotted line 30 emerging from the periphery of tension idler 17 to reel 18.

FIGURE 3 shows an alternative means of achieving the desired results of this invention. In the figure the idler roller 15 of FIGURES 1 and 2 is replaced by two separate idlers 35 and 36. They are positioned and dimensioned so as to make the tangent line defined by the tape 12 from their surfaces to the capstan 16 have a greater slope than the line 25 drawn as an extension of the edge of the twisted tape 12. Use of the two idlers 35 and 36 serves the advantage that any difference in tape velocity due to a difference in the elastic strain of the tape with idler rollers 35 and 36 will not affect the speed of the tape as much as it could for the common idler roller 15. If there is a difference in velocity of the tape emanating from the supply reel 10 compared to that of the tape going onto the takeup reel 18, this difference will be separately accommodated by idler 35 and 36 and not reflected as a difference in a common idler roller. The embodiment shown in FIGURE 3 would be important for systems where side effects of tape creepage are to be kept to a minimum; otherwise the common idler roller 15 of FIGURE 1 and FIGURE 2 is sufficient for most requirements.

What is claimed is:

1. A tape transport comprising,
an idler roller having an axis of rotation,
a capstan having an axis of rotation parallel to the axis of rotation of said idler roller, and having a diameter smaller than that of said idler roller,
said idler roller and said capstan forming a guiding path for a tape such that said tape in its direction of travel contacts said idler roller, passes around said capstan, and again contacts said idler roller substantially 180 degrees removed from said first-mentioned contact of said tape with said roller,
the size and position of said capstan relative to that of said idler roller being determined to cause the common tangents between said idler roller and capstan to have a greater slope than that of the slope of an imaginary line drawn as an extension of said tape in entering into said first-mentioned contact with said idler roller and of the slope of an imaginary line drawn as an extension of said tape in leaving said second-mentioned contact with said idler roller.

2. A tape transport comprising,
(a) a coaxial supply reel and takeup reel both rotatably mounted,
(b) a tape secured at one end to said supply reel and at its other end to said takeup reel,
(c) a first idler rotatably mounted above said supply reel with its axis of rotation parallel to that of said supply reel,
(d) a second idler rotatably mounted above said takeup reel with its axis of rotation parallel to that of said takeup reel,
(e) an idler roller having an axis of rotation substantially transverse to said axes of rotation of said first and second idlers,
(f) a capstan having an axis of rotation parallel to that of said idler roller with said capstan and said idler rollers axes of rotation defining a plane which is perpendicular to the axis of rotation of said supply and takeup reels,
(g) said first and second idlers, said idler roller and said capstan forming a guide path for said tape between said reels such that said tape in its direction of travel contacts said first idler then said idler roller, passes around said capstan and again contacts said idler roller substantially 180 degrees removed from said first mentioned contact and then contacts said second idler,
(h) the size and position of said capstan relative to that of said idler roller being determined to cause the common tangents between said idler roller and said capstan to have a greater slope than that of the slope of an imaginary line drawn as an extension of said tape entering into said first-mentioned contact with said idler roller and of the slope of an imaginary line drawn as an extension of said tape in leaving said second mentioned contact with said idler roller.

3. A tape transport comprising,
(a) a supply and a takeup reel each rotatably mounted with their axes of rotation parallel,
(b) an idler roller having an axis of rotation,
(c) a capstan having an axis of rotation parallel to the axis of rotation of said idler roller and positioned so that the plane defined by said parallel axes of said capstan and said idler roller is perpendicular to the axes of rotation of said supply and takeup reels, (d) a first positioning idler rotatably mounted above said supply reel, (e) a second positioning idler rotatably mounted above said takeup reel, (f) a tape secured at one end to said supply reel and which passes from said supply reel over said first positioning idler, and undergoes a 90 degree twist and contacts said idler roller, passes around said capstan and again contacts said idler roller substantially 180° removed from said first mentioned contact, undergoes a 90 degree twist, and passes over said second positioning idler to said takeup reel, (g) said capstan being dimensioned to have a substantially smaller diameter than that of said idler roller such that said tape in wrapping around said capstan is pressed flat against said idler roller at said two contact points causing the common tangents between said idler roller and said capstan defined by said tape therebetween to have a greater slope than the slope of an imaginary line drawn as an extension of at least one edge of said twisted sections of said tape.

4. A tape transport comprising, (a) a supply and a takeup reel each rotatably mounted with their axes of rotation in parallel, (b) a tape secured at one end to said takeup reel and at its other end to said supply reel, (c) an idler roller having an axis of rotation, (d) a capstan having an axis of rotation parallel to the axis of rotation of said idler roller and positioned so that the plane defined by said parallel axes of said capstan and said idler roller is perpendicular to the axes of rotation of said supply and takeup reels, (e) said idler and said capstan forming a guiding path for said tape such that said tape in its direction of travel between said reels undergoes a 90 degree twist, contacts said idler roller, passes around said capstan, again contacts said idler roller substantially 180 degrees removed from said first mentioned contact of said tape with said roller, and undergoes a reverse 90 degree twist, (f) the size of said capstan relative to that of said idler roller being determined to cause the common tangents between said idler roller and capstan to have a greater slope than that of an imaginary line drawn as an extension of said tape in entering into said first mentioned contact with said idler roller and of the slope of an imaginary line drawn as an extension of said tape in leaving said second mentioned contact with said idler roller.

5. A tape transport comprising, (a) a coaxial supply reel and takeup reel both rotatably mounted, (b) a first positioning idler rotatably mounted above said supply reel with its axis of rotation parallel to that of said supply reel, (c) a second positioning idler rotatably mounted above said takeup reel with its axis of rotation parallel to that of said takeup reel, (d) idling roller means having an axis of rotation substantially transverse to said axes of rotation of said first and second idlers, (e) a capstan having an axis of rotation parallel to that of said idling roller means, (f) a tape secured at one end to said supply reel and which passes from said supply reel over said first positioning idler, undergoes a 90 degree twist and contacts said idling roller means, passes around said capstan so that said tape forms a line of minimum length tangent to said idling roller means and said capstan, again contacts said idling roller means at a second point substantially 180° removed from said first contact, undergoes a reverse 90 degree twist and passes over said second positioning idler to said takeup reel.

6. The tape transport according to claim 5 wherein said idling roller means comprises, two separate idlers located between the supply and takeup reels and said capstan, and having an axis of rotation parallel to said capstan's axis of rotation, said separate idlers further positioned so that said tape contacts each separate idler at one point, said point being substantially 180 degrees apart on one idler as to the corresponding contact point on said other idler.

References Cited

UNITED STATES PATENTS

| | | | |
|---|---|---|---|
| 2,706,638, | 4/1955 | Bruderlin et al. | 242—56.9 X |
| 2,983,457 | 5/1961 | Toro | 242—55.12 |
| 3,033,480 | 5/1962 | Parzen | 242—55.12 |

GEORGE F. MAUTZ, *Primary Examiner.*